(12) United States Patent
Kawaji

(10) Patent No.: US 7,992,019 B2
(45) Date of Patent: Aug. 2, 2011

(54) SYSTEM DEVICE INCLUDING NIC AND POWER-SAVING CONTROLLING METHOD OF THE SAME

(75) Inventor: Seiji Kawaji, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 801 days.

(21) Appl. No.: 11/945,349

(22) Filed: Nov. 27, 2007

(65) Prior Publication Data

US 2008/0133950 A1 Jun. 5, 2008

(30) Foreign Application Priority Data

Nov. 30, 2006 (JP) ................................. 2006-323005

(51) Int. Cl.
G06F 1/26 (2006.01)
G06F 1/32 (2006.01)
(52) U.S. Cl. ........ 713/320; 713/300; 713/322; 713/324; 370/278; 370/281; 709/250
(58) Field of Classification Search .................. 713/300, 713/320, 322, 324; 370/278, 281; 709/250
See application file for complete search history.

(56) References Cited

U.S. PATENT DOCUMENTS

| | | | |
|---|---|---|---|
| 7,082,530 B1 * | 7/2006 | Diamant | 713/153 |
| 7,454,540 B2 * | 11/2008 | Oshikiri et al. | 710/60 |
| 7,577,857 B1 * | 8/2009 | Henderson et al. | 713/320 |
| 2006/0171300 A1 * | 8/2006 | Oshikiri et al. | 370/223 |
| 2006/0187944 A1 * | 8/2006 | Takeo et al. | 370/408 |
| 2006/0209722 A1 * | 9/2006 | Takeo et al. | 370/254 |

FOREIGN PATENT DOCUMENTS

| | | |
|---|---|---|
| JP | 07-321874 | 12/1995 |
| JP | 2001-154763 | 6/2001 |
| JP | 2001-353929 | 12/2001 |
| JP | 2003-089254 | 3/2003 |
| JP | 2004-048532 | 2/2004 |
| JP | 2004-110215 | 4/2004 |
| JP | 2005-094679 | 4/2005 |

OTHER PUBLICATIONS

Co-pending U.S. Application filed Nov. 27, 2007.

* cited by examiner

*Primary Examiner* — Chun Cao
*Assistant Examiner* — Michael J Brown
(74) *Attorney, Agent, or Firm* — Renner, Otto, Boisselle & Sklar, LLP

(57) ABSTRACT

The object is to realize reasonable power-saving operation in a NIC portion depending on a link status for the Ethernet in a system device including a NIC. For the protocol process functional portion and/or the encryption process functional portion in the NIC portions, the energy-saving process is executed in accordance with conditions, determined whether a protocol process is performed by the NIC or the controller depending on a link status. The power supply to the protocol process functional portion and the encryption process functional portion is turned off in the NIC.

7 Claims, 16 Drawing Sheets

FIG. 2

| CONDITION | ENERGY-SAVING PROCESS (1) | ENERGY-SAVING PROCESS (2) | ENERGY-SAVING PROCESS (3) | POWER CONSUMPTION | ENERGY SAVING |
|---|---|---|---|---|---|
| 1Gbps | MFPC/(NIC) | 500MHz | Enc HW | 4.0W | — |
| 100Mbps | MFPC/(NIC) | 300MHz | Enc SW | 2.9W | ▲1.1W |
| 10Mbps | (MFPC)/NIC | — | — | 0.0W | ▲4.0W |
| NO LINK | (MFPC)/NIC | — | — | 0.0W | ▲4.0W |
| | MFPC:0W NIC:4W | 500:2.0W 300:1.2W | HW:0.3W SW:0W | OTHERS:1.7W | |

FIG. 4

| CONDITION | ENERGY-SAVING PROCESS(1) | ENERGY-SAVING PROCESS(2) | ENERGY-SAVING PROCESS(3) | POWER CONSUMPTION | ENERGY SAVING |
|---|---|---|---|---|---|
| 11g/54Mbps | MFPC/(NIC) | 400MHz | Enc HW | 3.0W | — |
| 11b/11Mbps | (MFPC)/NIC | — | — | 0.0W | ▲3.0W |
| NO LINK | (MFPC)/NIC | — | — | 0.0W | ▲3.0W |
| | MFPC:0W<br>NIC:3W | 400:1.5W | HW:0.3W | OTHERS:1.2W | |

FIG. 5

| CONDITION | ENERGY-SAVING PROCESS(1) | ENERGY-SAVING PROCESS(2) | ENERGY-SAVING PROCESS(3) | POWER CONSUMPTION | ENERGY SAVING |
|---|---|---|---|---|---|
| 11g/54Mbps | MFPC/(NIC) | 400MHz | Enc HW | 3.0W | — |
| 11b/11Mbps | MFPC/(NIC) | 200MHz | Enc SW | 2.3W | ▲0.7W |
| 11b/11Mbps | (MFPC)/NIC | — | — | 0.0W | ▲3.0W |
| NO LINK | (MFPC)/NIC | — | — | 0.0W | ▲3.0W |
| | MFPC:0W<br>NIC:3W | 400:1.5W<br>200:1.1W | HW:0.3W<br>SW:0W | OTHERS:1.2W | |

SYSTEM A

| CONDITION | ENERGY-SAVING PROCESS(1) | ENERGY-SAVING PROCESS(2) | ENERGY-SAVING PROCESS(3) | POWER CONSUMPTION | ENERGY SAVING |
|---|---|---|---|---|---|
| 1Gbps | MFPC/NIC | 500MHz | Enc HW | 4.0W | — |
| 100Mbps | MFPC/NIC | 300MHz | Enc HW | 3.2W | ▲0.8W |
| 10Mbps | MFPC/NIC | 300MHz | Enc SW | 2.9W | ▲1.1W |
| NO LINK | (MFPC)/NIC | — | — | 0.0W | ▲4.0W |
| | MFPC:0W NIC:4W | 500:2.0W 300:1.2W | HW:0.3W SW:0W | OTHERS:1.7W | |

(B)

SYSTEM B

| CONDITION | ENERGY-SAVING PROCESS(1) | ENERGY-SAVING PROCESS(2) | ENERGY-SAVING PROCESS(3) | POWER CONSUMPTION | ENERGY SAVING |
|---|---|---|---|---|---|
| 1Gbps | MFPC/NIC | 500MHz | Enc HW | 4.0W | — |
| 100Mbps | MFPC/NIC | 500MHz | Enc SW | 3.4W | ▲0.6W |
| 10Mbps | MFPC/NIC | 300MHz | Enc SW | 2.9W | ▲1.1W |
| NO LINK | (MFPC)/NIC | — | — | 0.0W | ▲4.0W |
| | MFPC:0W NIC:4W | 500:2.0W 300:1.5W | HW:0.6W SW:0W | OTHERS:1.4W | |

Et ENERGY-SAVING SETTING: AT THE TIME OF 100 Mbps

Et ENERGY-SAVING SETTING: AT THE TIME OF 10 Mbps OR NO LINK

FIG. 13  MFPC CPU PROCESS FLOW (A PLURALITY OF NICS)

SYSTEM DEVICE INCLUDING NIC AND POWER-SAVING CONTROLLING METHOD OF THE SAME

CROSS-NOTING PARAGRAPH

This Non-provisional application claims priority under 35 U.S.C. §119 (a) on Patent Application No. 2006-323005 filed in JAPAN on Nov. 30, 2006, the entire contents of which are hereby incorporated herein by reference.

FIELD OF THE INVENTION

The present invention relates to a system device including a NIC (Network Interface Card) to transmit/receive data through a network and a power-saving controlling method of the system device.

BACKGROUND OF THE INVENTION

System devices including NICs for transmitting/receiving data through a network include, for example, digital multi-function peripherals (hereinafter, MFP), which give/receive image data to/from a host PC. In these MFPs, if no operation is performed or no data transmission is performed by the host PC for a predetermined time period or more, the MFPs are shifted to an energy-saving mode by turning off a fixing heater, a printer controller, etc.

For example, Japanese Laid-Open Patent Publication No. 2003-089254 discloses a technology of driving an input/output portion to execute processes for network monitoring and data transmission/reception such that data can be transmitted/received even when an image forming apparatus is shifted to the energy-saving mode. Japanese Laid-Open Patent Publication No. 2004-110215 discloses a technology of putting an image forming apparatus into the power-saving state if it is detected that all the host computers connected through a network are turned off.

Japanese Laid-Open Patent Publication No. 7-321874 discloses a data communication apparatus that changes a clock frequency of a data processing CPU depending on communication speed to achieve power saving.

However, the conventional arts of Japanese Laid-Open Patent Publication No. 2003-089254 or 2004-110215 do not achieve the power-saving operation of the NIC itself, and the conventional art of Japanese Laid-Open Patent Publication No. 7-321874 only changes the operation clock frequency of the data processing CPU and cannot achieve reasonable power-saving operation corresponding to a plurality of functions included in the NIC.

For example, in the case of the NIC equipped with an encryption chip, although the high-speed processing ability of the encryption chip is effectively utilized in environments where a high-speed encryption process must be executed through link connection at speed of 1 Gbps, it is still problematic that excessive electric power is consumed since the same process is executed and the device is driven at the same level as the 1-Gbps case even if no link exists or a low-speed link such as 10-Mbps link is used.

SUMMARY OF THE INVENTION

The present invention was conceived to solve above problems and it is therefore the object of the present invention to realize reasonable power-saving operation in a NIC portion corresponding to a plurality of functions of a NIC depending on link speed or presence of the link (hereinafter, link status) in a system device including the NIC for transmitting/receiving data through a network.

In order to achieve the above object, the present invention comprises the following technical means.

A first technical means is a system device comprising a NIC including a network I/F, a protocol process functional portion, and an encryption process functional portion as well as a controller responsible for overall control, the controller performing power-saving control that selectively reduces or terminates processing abilities of the protocol process functional portion and/or the encryption process functional portion by executing for the protocol process functional portion and/or the encryption process functional portion of the NIC a combination of different energy-saving processes corresponding to the processing functions thereof, depending on a link status, to stepwise reduce electric power consumed by constituent elements of the process functional portions depending on the link status.

A second technical means is the system device comprising a NIC as defined in the first technical means, wherein in one of the energy-saving processes, it is determined whether a protocol process is performed by the NIC or the controller in accordance with the link status, and wherein if the process is performed by the controller, the power supply to the protocol process functional portion and the encryption process functional portion is terminated in the NIC.

A third technical means is the system device comprising a NIC as defined in the second technical means, wherein in another one of the plurality of the energy-saving processes, an operation clock frequency is changed in a CPU, which is one of constituent elements of the protocol process functional portion and the encryption process functional portion, depending on the link status.

A fourth technical means is the system device comprising a NIC as defined in the second technical means, wherein in yet another one of the plurality of the energy-saving processes, encryption by hardware and encryption by software are switched in an encryption process executed by the encryption process functional portion depending on the link status.

A fifth technical means is the system device comprising a NIC as defined in the first technical means, wherein the power consumption information of the constituent elements implementing the functions of the NIC is stored in a storage portion and wherein based on the power consumption information of the constituent elements acquired from the storage portion, the controller determines an optimum combination of the energy-saving processes depending on the link status.

A sixth technical means is the system device comprising a NIC as defined in the first technical means, wherein the power-saving control is performed by executing a predetermined program with the CPU of the controller.

A seventh technical means is the system device comprising a NIC as defined in the sixth technical means, wherein the predetermined program is acquired from a storage portion of the NIC portion.

An eighth technical means is the system device comprising a NIC as defined in the fifth technical means, wherein the order of the power consumption in the energy-saving processes is preliminarily determined and wherein the order is adapted to the order of execution of the combined energy-saving processes.

A ninth technical means is the system device comprising a NIC as defined in the first technical means, wherein if a plurality of NICs are connected to the controller, a power-saving state of the other NIC portion is added to the condition for determining the combination of the energy-saving processes and/or the order of application of the combined energy-saving processes for one NIC portion.

A tenth technical means is a power-saving controlling method of a system device comprising a NIC including a network I/F, a protocol process functional portion, and an encryption process functional portion, the method comprising: providing power-saving control that selectively reduces or terminates processing abilities of the protocol process functional portion and/or the encryption process functional portion by executing for the protocol process functional portion and/or the encryption process functional portion of the NIC a combination of different energy-saving processes corresponding to the processing functions thereof, depending on a link status, to thereby stepwise reduce electric power consumed by constituent elements of the process functional portions in accordance with the link state.

An eleventh technical means is the power-saving controlling method of a system device comprising a NIC as defined in the tenth technical means, wherein the energy-saving processes include (1) determining whether a protocol process is performed by the NIC or the controller depending on the link status and turning off the power supply to the protocol process functional portion and the encryption process functional portion in the NIC if the process is performed by the controller, (2) changing an operation clock frequency of a CPU of the NIC implementing the functions of the protocol process functional portion and the encryption process functional portion depending on the link status, and (3) switching the encryption process by hardware and the encryption process by software in the NIC depending on the link state.

BRIEF DESCRIPTION OF THE DRAWINGS

FIG. 2 is a table of basic combinations of energy-saving processes and the energy-saving effects thereof when energy is saved in an image forming apparatus including one wired NIC;

FIG. 4 is a table of combination examples of the energy-saving processes for each condition and the energy-saving effects thereof in the case of the wireless NIC;

FIG. 5 is an explanatory view of how the energy-saving processes are combined when two NICs (wired NIC and wireless NIC) are connected to the printer controller;

FIG. 6 shows tables of combination examples of the energy-saving processes and the energy-saving effect comparison examples when types of the NICs are different;

PREFERRED EMBODIMENTS OF THE INVENTION

Embodiments of the present invention will hereinafter be described with reference to the drawings, taking an MFP including a NIC as an example.

FIGS. 1(A) to 1(C) are explanatory views in the case of performing the power-saving control in an MFP having one NIC connected to a printer controller; FIG. 1(A) depicts an example of an energy-saving process (1); FIG. 1(B) depicts an example of an energy-saving process (2); FIG. 1(C) depicts an example of an energy-saving process (3); and shaded portions represent targets of the energy-saving processes.

Figure 1:
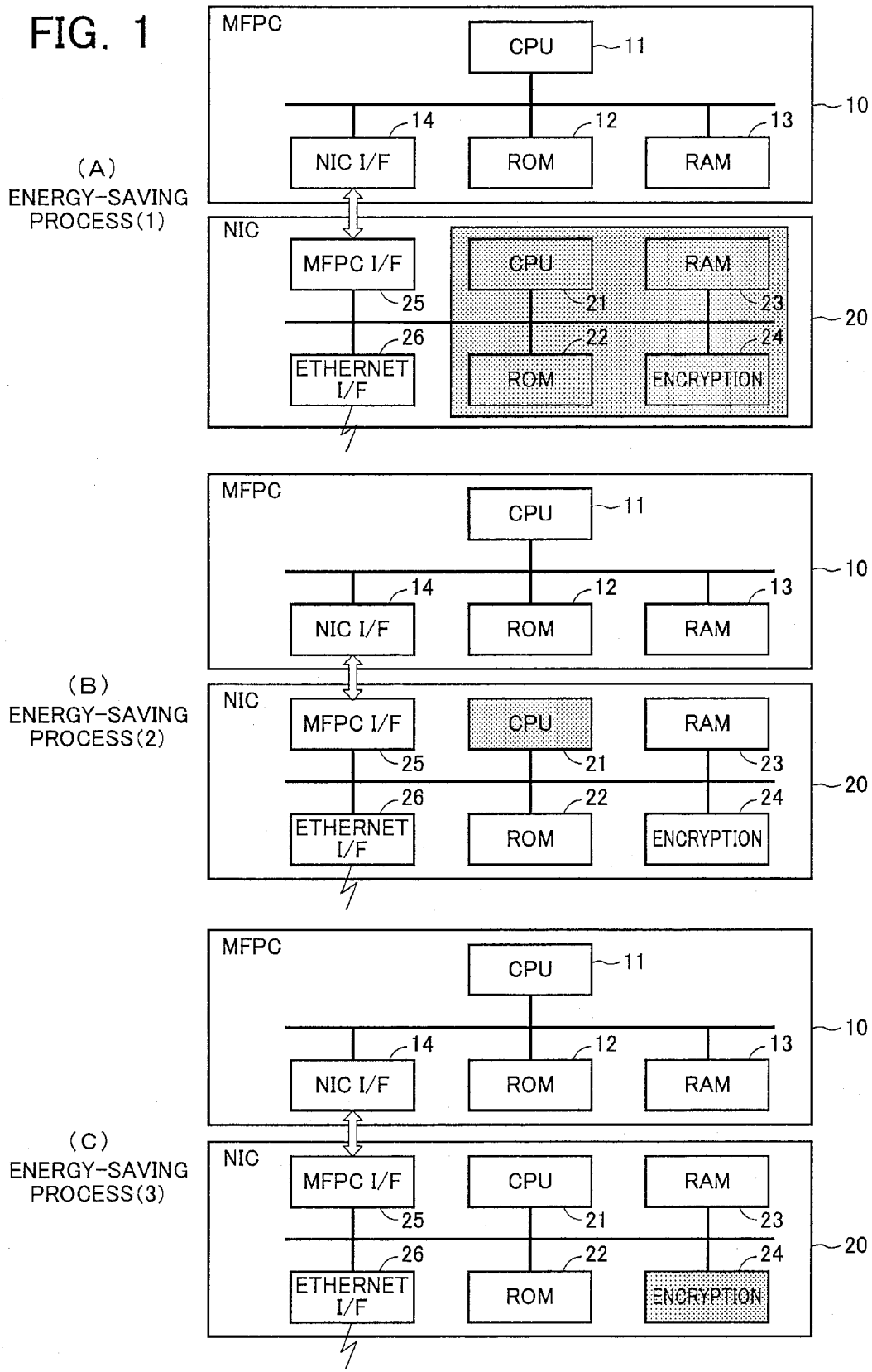
FIG. 1 is an explanatory view of locations on a NIC, which are targets of energy-saving processes, according to an embodiment of the present invention.

In FIG. 1, a printer controller 10 includes a CPU 11, a ROM 12, a RAM 13, and a NIC interface (NIC I/F) 14. A NIC 20 connected to the printer controller 10 includes a CPU 21, a ROM 22, a RAM 23, an encryption chip (Encryption) 24, an MFPC interface (MFPC I/F) 25, and an Ethernet I/F 26.

The printer controller 10 performs control for receiving print data sent from the NIC 20 through the NIC I/F 14, executing a predetermined image process to convert the print data into bit map data for printing, and transmitting the data to a print engine to print the data. The NIC 20 receives data sent from a PC through the Ethernet I/F 26, executes a protocol process and an encryption process for the received data, and transmits the data to the printer controller 10 through the MFPC I/F 25.

Although the CPU 11 of the printer controller 10 implements a function of performing various controls based on programs and information stored in the ROM 12, controls other than the control related to the energy saving according to the present invention will not be described. The program for performing the energy saving may preliminarily be stored in the ROM 12, or may be stored in a storage portion of the NIC 20 and taken out and acquired by the printer controller 10 when the NIC 20 is connected as described later.

The CPU 21 executes a protocol process of data transmitted/received by the NIC 20 using programs and protocol information stored in the ROM 22. The RAM 23 temporarily and readably stores information necessary for the process of the CPU 21.

The encryption processing function is implemented in software by executing the program stored in the ROM 22 with the CPU 21 or by using hardware of the encryption chip 25.

FIG. 2 depicts a table of combinations of energy-saving processes and the energy-saving effects thereof under each condition, i.e., depending on link speed for the Ethernet or presence of the link for the Ethernet (hereinafter, link status).

First, with regard to the energy-saving process (1), it is determined in this energy-saving process whether a network process including a protocol process is executed by the CPU 21 of the NIC 20 or by the CPU 11 of the printer controller 10 depending on the above link speed or presence of the link, and if the link speed is low or if no link exists, power consumption of 4.0 W is saved by terminating the power supply to the CPU 21, the ROM 22, the RAM 23, and the encryption chip 24. In FIG. 2, "MFPC: 0 W" of the energy-saving process (1) is determined based on the idea that the CPU 11 of the printer controller 10 originally consumes electric power to operate the image process of received data and needs no new electric power if the protocol process executed by the CPU 21 of the NIC 20 is executed by the CPU 11 of the printer controller 10.

In FIG. 1(A), shading indicates constituent parts to which the power supply is terminated as above. In this case, the Ethernet I/F 26 is controlled by the CPU 11 of the printer controller 10, and the network process of received data is executed by the printer controller 10. When the link speed is 100 Mbps or 1 Gbps, the network process is performed by the CPU 21 of the NIC 20, which has a higher processing ability.

The monitoring of the link speed and the energy saving performed by combining the above energy-saving process (1) and energy-saving processes (2) and (3) described later are controlled by the CPU 11 of the printer controller 10 with the energy-saving program described later.

With regard to the energy-saving process (2) of FIG. 1(B) showing that the CPU 21 is the target of the energy-saving process, the operation clock frequency of the CPU 21 of the NIC 20 is changed depending on the link status, and if the link speed is 100 Mbps, the frequency is lowered from 500 MHz in the case of 1 Gbps to 300 MHz, which reduces the power consumption from 2.0 W to 1.2 W to save the difference of 0.8 W. If the link speed is 10 Mbps or if no link exists, the energy-saving process (2) has no impact since the power supply to the CPU 21 is terminated.

With regard to the energy-saving process (3) showing that the encryption chip 24 is the target of the energy-saving process, electric power is saved by switching a high speed encryption process (Enc HW) using hardware, i.e., the encryption chip, and an encryption process (Enc SW) using software depending on the link status, and in the table of FIG. 2, the power consumption is 0.3 W when the encryption process is performed by the encryption chip 24 (Enc HW) and is zero when the encryption process is performed by software (Enc SW). When the encryption process is performed by software, the power consumption is defined as zero based on the idea that the CPU 21 originally consumes electric power to operate the network processes other than the encryption process and needs no new electric power for the encryption process.

Therefore, the encryption process (Enc HW) of the encryption chip 24 having the high process ability is used if the link speed is 1 Gbps, and the power saving effect of 0.3 W is acquired by executing the program stored in, for example, the ROM 22, to switch the process to the encryption process (Enc SW) of the software in the case of 100 Mbps.

The energy-saving effects acquired by applying the combinations of the above energy-saving processes are summarized for each condition, i.e., for each link status as follows. In the case of 1 Gbps, the energy saving is not performed as described above. In the case of 100 Mbps, 0.8 W is saved since the energy-saving process (2) is performed, i.e., the CPU operation clock frequency of the NIC 20 is lowered to 300 MHz and the power consumption is reduced from 2.0 W to 1.2 W, and 0.3 W is saved since the energy-saving process (3) is performed, i.e., the encryption process is switched from hardware to software. Assuming that remaining power consumption (for the ROM and the RAM) is 1.7 W, since the total power consumption is 2.9 W, the total energy-saving effect of 1.1 W is acquired. In the case of 10 MHz or no link, the energy-saving effect of 4.0 W is acquired by the energy-saving process (1), i.e., by terminating the power supply to the portions other than the Ethernet I/F 26.

Figure 3:
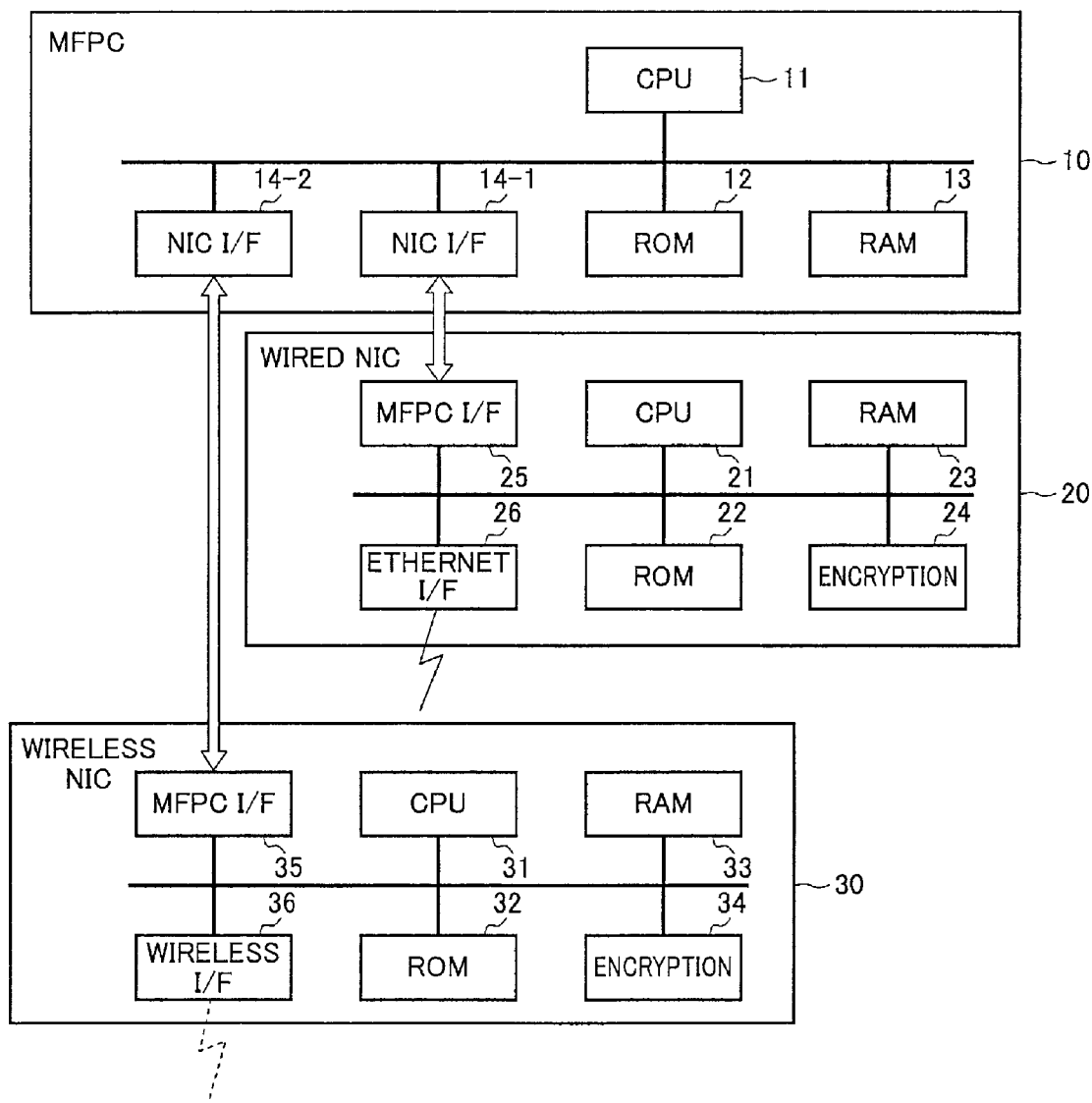
FIG. 3 is an explanatory view when two NICs (wired NIC and wireless NIC) are connected to a printer controller.

FIG. 3 depicts an example of connecting a plurality of NICs to the printer controller 10, and a wired NIC 20 and a wireless NIC 30 are connected to a first NIC I/F 14-1 and a second NIC I/F 14-2, respectively. A CPU 31, a ROM 32, a RAM 33, an encryption chip (Encryption) 34, a printer controller I/F (MFPC I/F) 35, and a wireless I/F 36 of the wireless NIC 30 have the same functions as the wired NIC 20 and will not be described.

FIG. 4 is a table of combinations of the energy-saving processes for each condition and the energy-saving effects thereof in the case of the wireless NIC 30. The wired NIC 20 in this embodiment is the same as the case of FIG. 2. In FIG. 4, "11g/54 Mbps" and "11b/11 Mbps" shown as conditions mean the wireless LAN standards IEEE 802.11g and IEEE 802.11b, respectively.

In the example of FIG. 4, the overall power consumption of the NIC is 3.0 W; when the CPU operation clock frequency is 400 MHz, the power consumption is 1.5 W; the encryption process by hardware (Enc HW) consumes 0.3 W; and others consume 1.2 W.

In the energy-saving processes in this case, the condition 11g/54 Mbps does not cause the energy-saving process to be executed. In the case of 11b/11 Mbps or no link, the energy-saving process (1) is executed to terminate the power supply to the constituent parts other than the wireless I/F 36, i.e., the CPU 31, the ROM 32, the RAM 33, and the encryption chip 34; the wireless I/F 36 is controlled by the CPU 11 of the printer controller 10; and the CPU 11 of the printer controller 10 is used for the protocol process of transmitted/received data. The energy-saving effect of 3.0 W is acquired by the energy-saving process (1).

In the case of the printer controller having a plurality of NICs, not only the link status but also the power-saving state of the other NIC may be added to the condition for determining the combinations of the energy-saving processes and the order of application thereof. For example, when the wireless link is 11b/11 Mbps, the determination is made such that the protocol process of the wireless NIC is executed by the CPU 31 of the NIC 30 if the CPU 11 of the printer controller 10 is used for the protocol process of the wired NIC 20 and such that the protocol process of the wireless NIC 30 is executed by the CPU 11 of the printer controller 10 if the CPU 11 of the printer controller 10 is not used for the protocol process of the wired NIC 20.

FIG. 5 depicts a specific example, and when the network process of the wired NIC 20 is executed by the CPU 11 of the printer controller 10, if the link speed is 11b/11 Mbps, a combination is employed to perform the protocol process with the CPU 31 of the wireless NIC 30 for the energy-saving process (1), to set the operation clock frequency of the CPU 21 to 200 MHz for the energy-saving process (2), and to perform the encryption process in software (Enc SW) for the energy-saving process (3). Since 0.4 W is saved for the operation clock frequency of the CPU 21 and 0.3 W is saved for the encryption process in software (Enc SW) in this case, it is represented that a total energy-saving effect of 0.7 W is acquired. The cases of other conditions are the same as FIG. 4 and will not be described.

Since the power consumption of the constituent parts of the NIC is different depending on types and manufacturers of NICs, the combinations of the energy-saving processes are correspondingly determined. Describing with a specific example of FIG. 6, for example, when the CPU operation clock frequency is lowered from 500 MHz to 300 MHz (the energy-saving process (2)), the energy-saving effect is 0.8 W (2.0 W−1.2 W) in a system A shown in FIG. 6(A) while the effect is 0.5 W (2.0 W−1.5 W) in a system B shown in FIG. 6(B). When the encryption process is executed by hardware, the power consumption of the system A is 0.3 W while that of the system B is 0.6 W, and the power consumption of others is 1.7 W in the system A and 1.4 W in the system B.

In the case of such differences, when the link speed is 100 Mbps in the example of FIG. 6, the system A acquires 0.8 W of the power-saving effect by lowering the operation clock frequency of the CPU 21 from 500 MHz to 300 MHz for the power-saving process (2) while the system B acquires 0.6 W of the power-saving effect by switching the encryption from hardware to software without lowering the operation frequency. The combination of the system A is selected if the encryption processing ability is prioritized over the processing ability of the CPU, and the combination of the system B is selected if the processing ability of the CPU is prioritized over the encryption processing ability.

In the combinations when the link speed is 10 Mbps, the system A acquires a total power-saving effect of 1.1 W, i.e., 0.8 W by lowering the operation clock frequency of the CPU 21 to 300 MHz and 0.3 W by switching the encryption process to software; the system B acquires a total power-saving effect of 1.1 W, i.e., 0.5 W by lowering the operation clock frequency to 300 MHz and 0.6 W by switching the encryption process to software; and, therefore, the same power-saving effects are consequently acquired for the power consumption.

Figure 7:
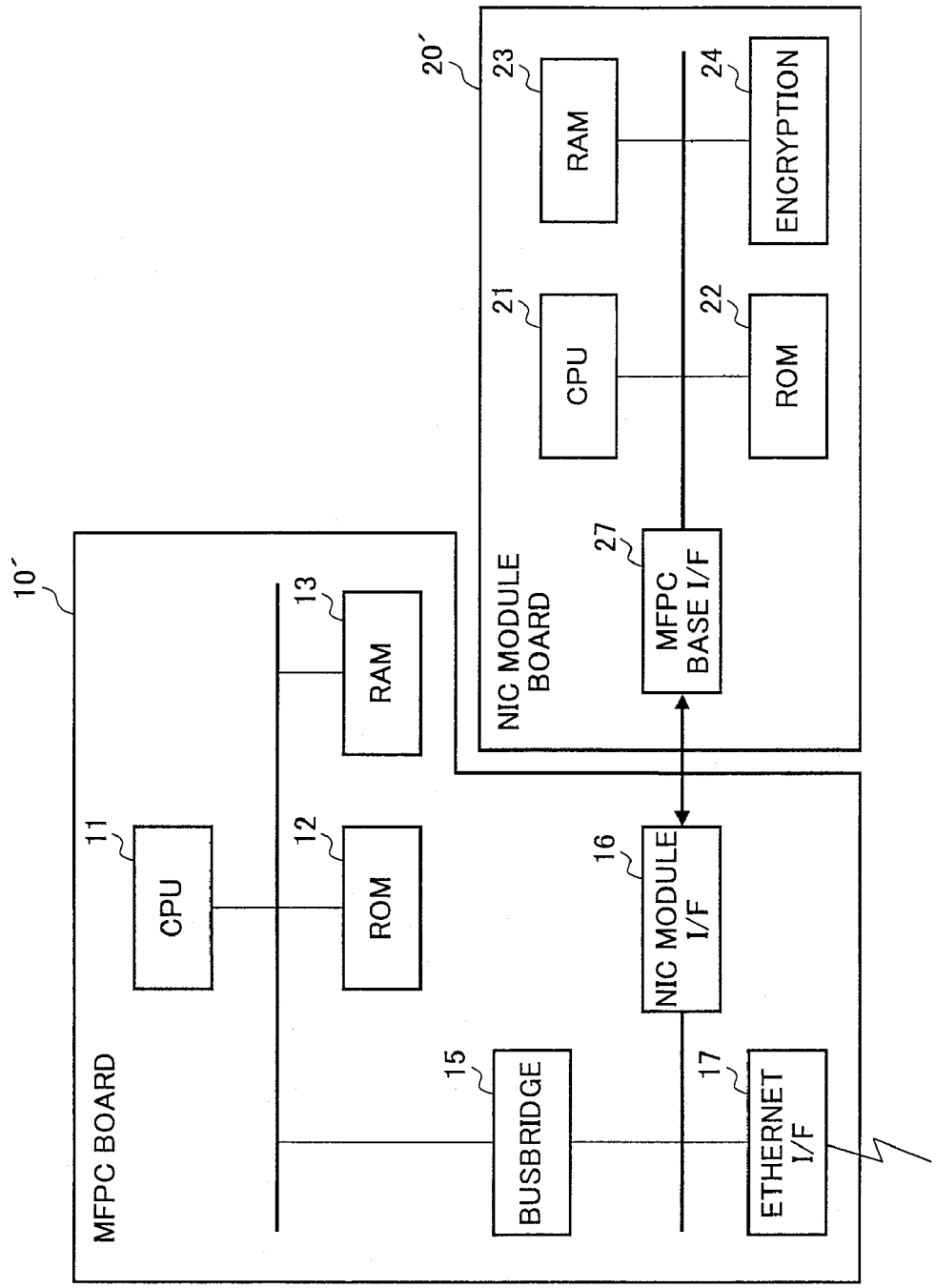
FIG. 7 is an explanatory view when an Ethernet I/F portion is disposed on the printer controller.

FIG. 7 depicts an example of disposing an Ethernet I/F portion on a printer controller portion 10' to configure a NIC module board 20' without mounting the Ethernet I/F on the NIC. In this case, if a printer controller 10' is enabled to execute a protocol process through a low-speed link, the MFP can give/receive data through a network even when the NIC module board 20' is not connected, and the NIC module board 20' is connected if needed.

In this case, the above power-saving control program is stored in the ROM 22 or other storage portion disposed on the NIC module board 20', and the printer controller is enabled to download the program when the board 20' is connected to the printer controller portion 10'. The appropriate power-saving operation of the NIC can be achieved by performing the same power-saving control in this situation.

In this case, since the power consumption for each operation clock frequency of the CPU and the power consumption of the encryption chip and other portions such as ROM and RAM are varied in the NIC depending on manufacturers, model numbers, etc., the information thereof is preliminarily stored in a storage portion such as a flash memory and the information is made readable when downloading the power-saving control program.

Figure 8:
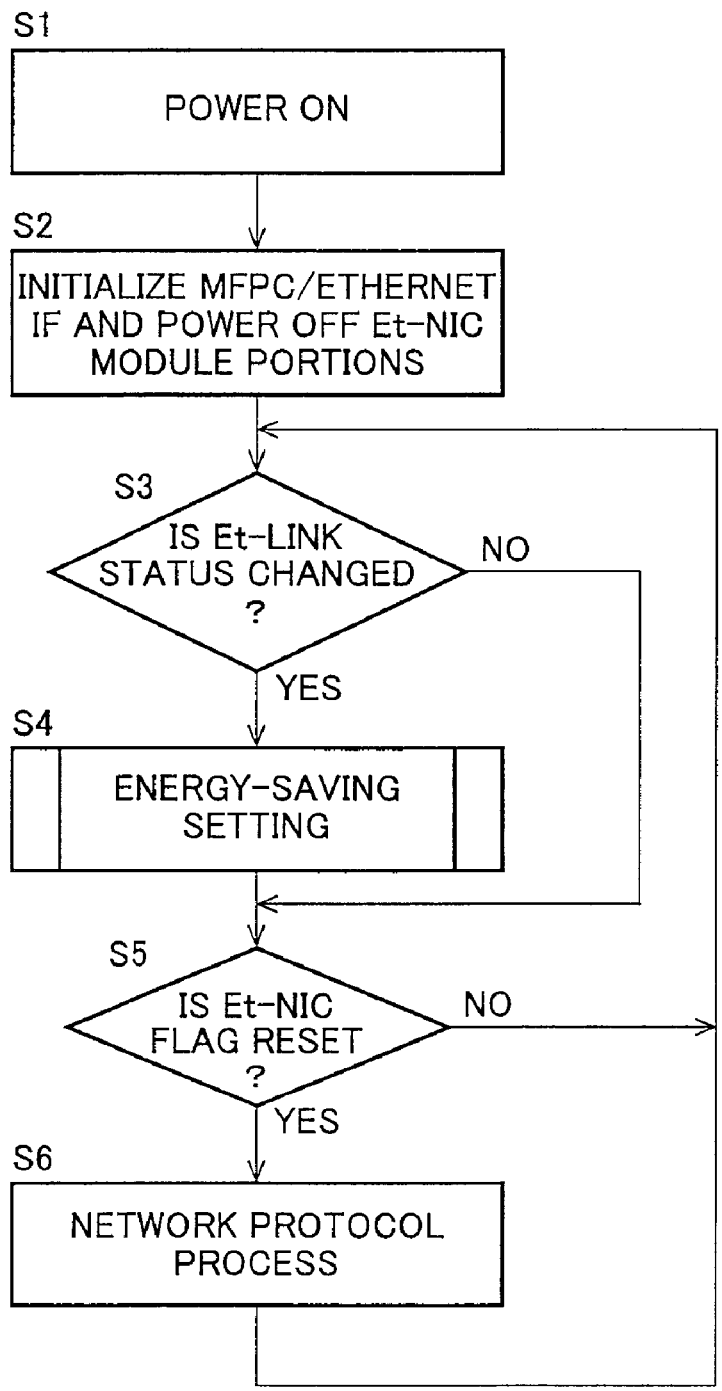
FIG. 8 depicts a flow of processes executed by a CPU of the printer controller in a basic combination of the energy-saving processes.

The process flows in the case of executing the above energy saving will be described with reference to FIGS. 8 to 17. In FIGS. 8 to 17, "Et", "Rf", and "Enc" means wired (Ethernet), wireless (Radio Frequency), and encryption, respectively. FIG. 8 depicts a flow of processes executed by the CPU of the printer controller. When the apparatus is powered on (step S1), the printer controller and the Ethernet I/F are initialized and Et-NIC module portions are turned off (step S2). If the Et-Link status is not changed (step S3/N), the flow goes to step S5, and if the Et-NIC flag is not reset (step S5/N), the flow goes back to step S3. If the Et-Link status is changed, i.e., the link status is changed at step S3, the energy-saving setting is performed in accordance with the status ("condition" in FIG. 2); the network protocol process is executed at step S6; and after the protocol process is completed, the flow goes back to step S3.

Figure 9:
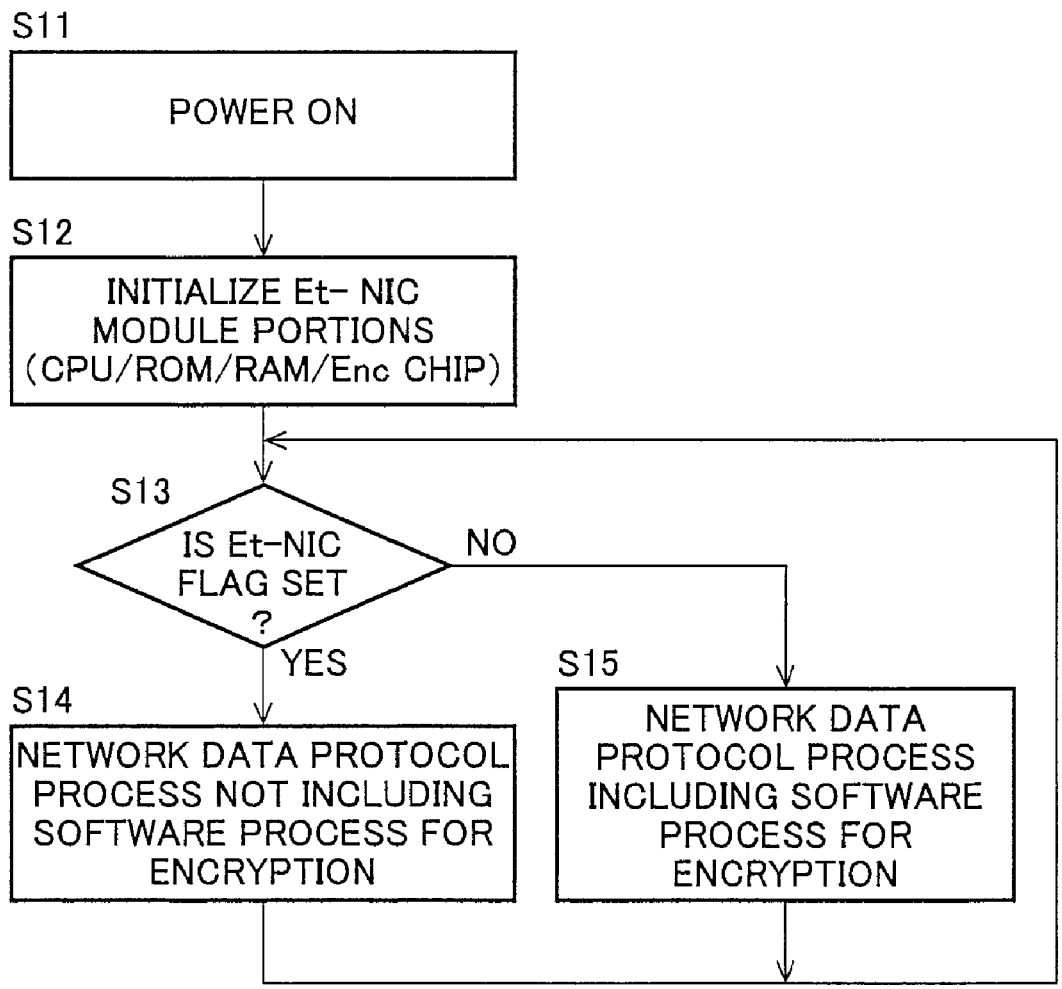
FIG. 9 depicts a flow of processes executed by a CPU of the Et (wired) NIC in a combination of the energy-saving processes.

FIG. 9 depicts a CPU process flow of the wired NIC (hereinafter, Et-NIC) and is the case when the Et-Link status is changed at step S3 of the flow of FIG. 8 and when the network process and the encryption process are executed by the NIC in the energy-saving setting of step S4.

That is, if the link speed is 100 Mbps or 1 Gbps as in this example, the power is turned on under the control of the printer controller 10 (step S11) and, first, the Et-NIC module portions (the CPU, the ROM, the RAM, and the encryption chip) are initialized (step S12). If the flag of the Et-NIC has been set (step S13/Y), the network data protocol process is executed without the inclusion of the software process for the encryption (step S14), and if the flag of the Et-NIC has not been set (step S13/N), the network data protocol process is executed with the inclusion of the software process for the encryption (step S15) and the flow goes back to step S13.

Figure 10:
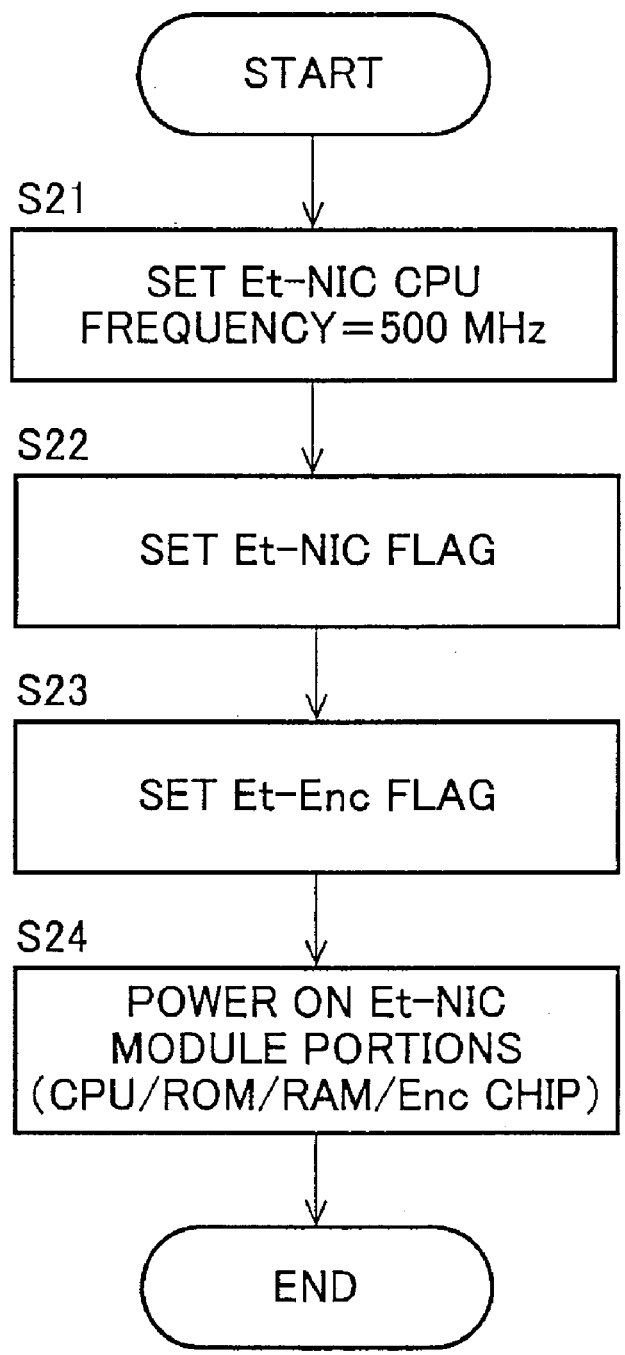
FIG. 10 is a flowchart of the energy-saving setting of the Et-NIC in the case of 1 Gbps.

The energy-saving setting of step S4 of FIG. 8 will be described with reference to FIGS. 10 to 12. In the setting process executed in the case of the link speed of 1 Gbps, as shown in FIG. 10, first, the operation clock frequency of the Et-NIC CPU is set to 500 MHz (step S21); the Et-NIC flag is set (step S22); the Et-Enc flag is set (step S23); the Et-NIC module portions (the CPU, the ROM, the RAM, and the encryption chip) are powered on (step S24); and the process is terminated. As described above, the power-saving effect is not generated in the NIC in this case.

Figure 11:
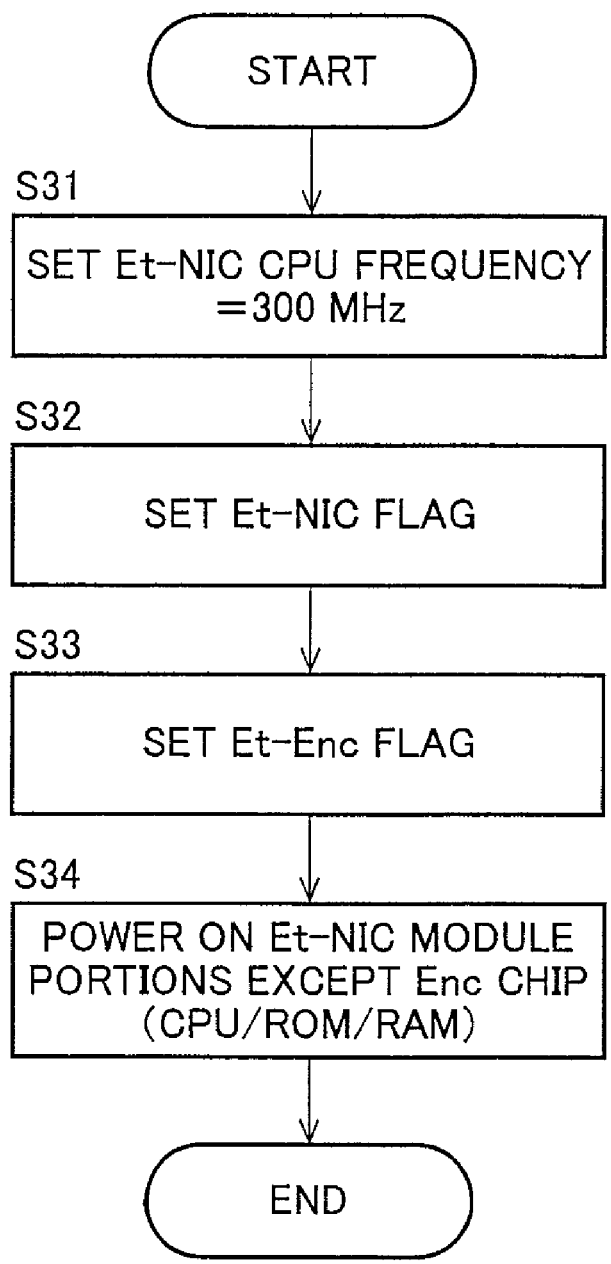
FIG. 11 is a flowchart of the energy-saving setting of the Et-NIC in the case of 100 Mbps.

In the energy-saving setting in the case of the link speed of 100 Mbps, as shown in FIG. 11, the operation clock frequency of the Et-NIC CPU is set to 300 MHz (step S31); the Et-NIC flag is set (step S32); the Et-Enc flag is set (step S33); the Et-NIC module portions except the encryption chip (the CPU, the ROM, and the RAM) are powered on (step S34); and the process is terminated.

Figure 12:
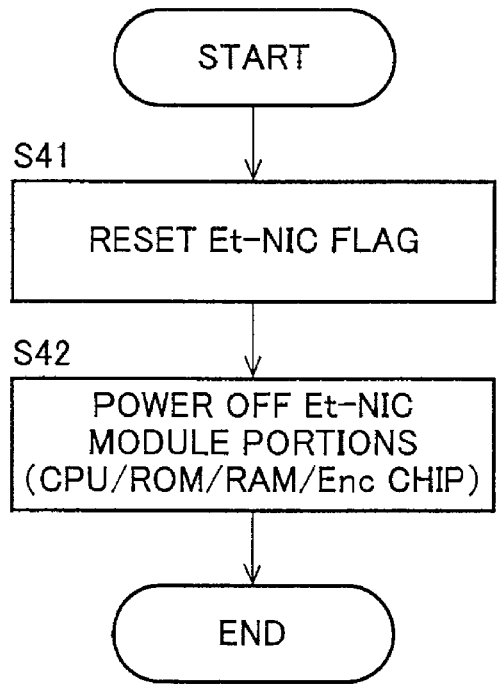
FIG. 12 is a flowchart of the energy-saving setting of the Et-NIC in the case of 10 Mbps or no link.

In the energy-saving setting in the case of the link speed of 10 Mbps and no link, as shown in FIG. 12, the Et-NIC flag is reset (step S41); the Et-NIC module portions, i.e., the CPU, the ROM, the RAM, and the encryption chip are powered off (step S42); and the process is terminated.

Figure 13:
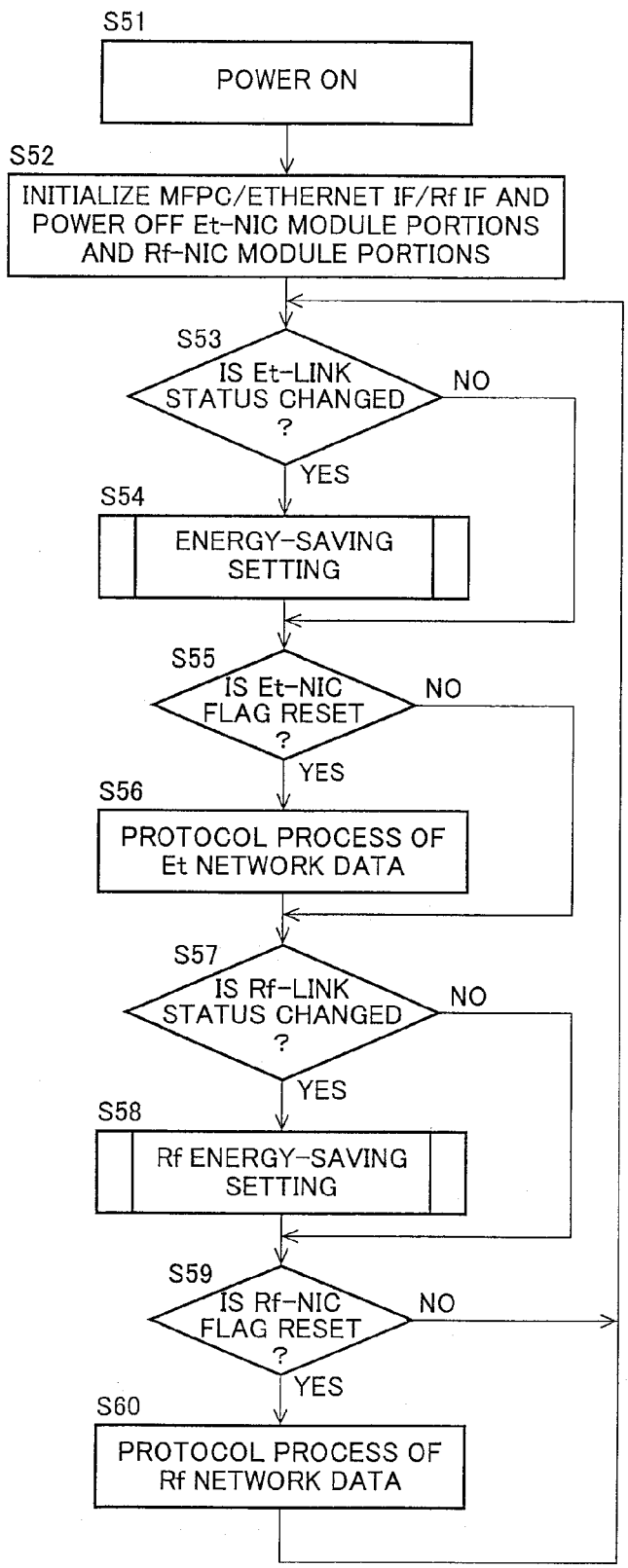
FIG. 13 depicts a flow of processes executed by the CPU of the printer controller when two NICs (wired NIC and wireless NIC) are connected.

FIG. 13 depicts a process flow of the CPU of the printer controller in the environment including the Et-NIC and the Rf-NIC shown in FIG. 3.

When the apparatus is powered on (step S51), the MFPC, the Ethernet I/F, and the Rf-IF are initialized; the Et-NIC module portions and the Rf-NIC module portions are turned off (step S52); if the Et-Link status is changed (step S53/Y), the energy-saving setting is performed (step S54); and if the Et-Link status is not changed (step S53/N), the flow goes to step S55. If the Et-NIC flag is reset (step S55/Y), the protocol process of the Et network data is executed (step S56), and if the Et-NIC flag is not reset (step S55/N), the flow goes to step S57.

If the Rf-Link status is changed at step S57 (step S57/Y), the energy-saving setting is performed in accordance with the status ("conditions" of FIG. 4 or 5), and if the Rf-Link status is not changed at step S57 (step S57/N), the flow goes to step S59.

If the Rf-NIC flag is reset at step S59 (step S59/Y), the protocol process of the Rt network data is executed (step S60) and the flow goes back to step S53, and if the Rt-NIC flag is not reset (step S59/N), the flow goes back to step S53 to repeat the same processes.

Figure 14:
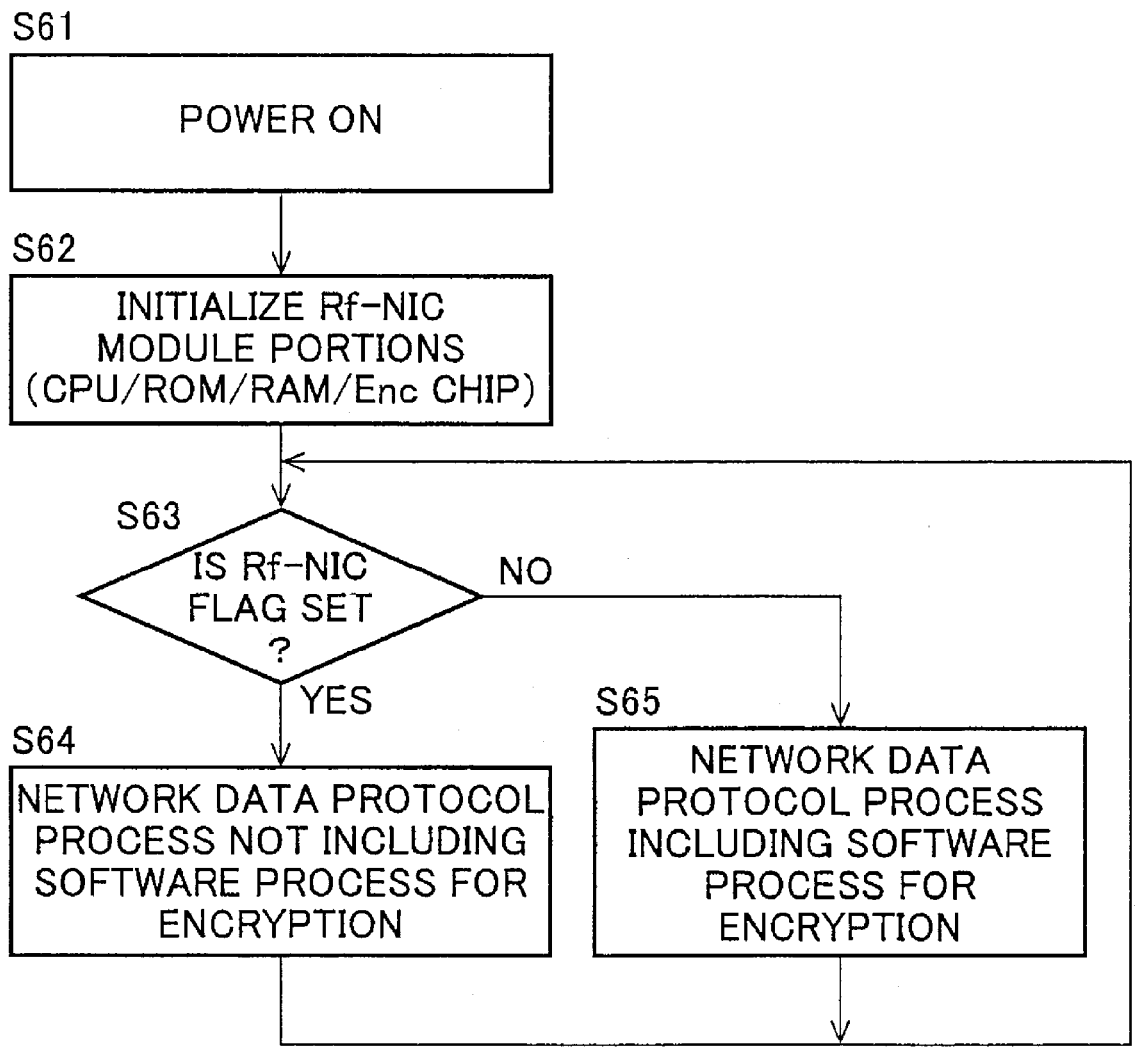
FIG. 14 depicts a flow of processes executed by a CPU of an Rf (wireless) NIC in a combination of the energy-saving processes.

In the process flow of the CPU of the Rf-NIC, as shown in FIG. 14, when the power is turned on (step S61), the Rf-NIC module portions (the CPU, the ROM, the RAM, and the encryption chip) are initialized (step S62), and If the flag of the Rf-NIC has been set (step S63/Y), the network data protocol process is executed without the inclusion of the software process for the encryption (step S64), and if the flag of the Rf-NIC has not been set (step S63/N), the network data protocol process is executed with the inclusion of the software process for the encryption (step S65) and the flow goes back to step S63.

The energy-saving setting of step S58 of FIG. 13 will be described.

Figure 15:
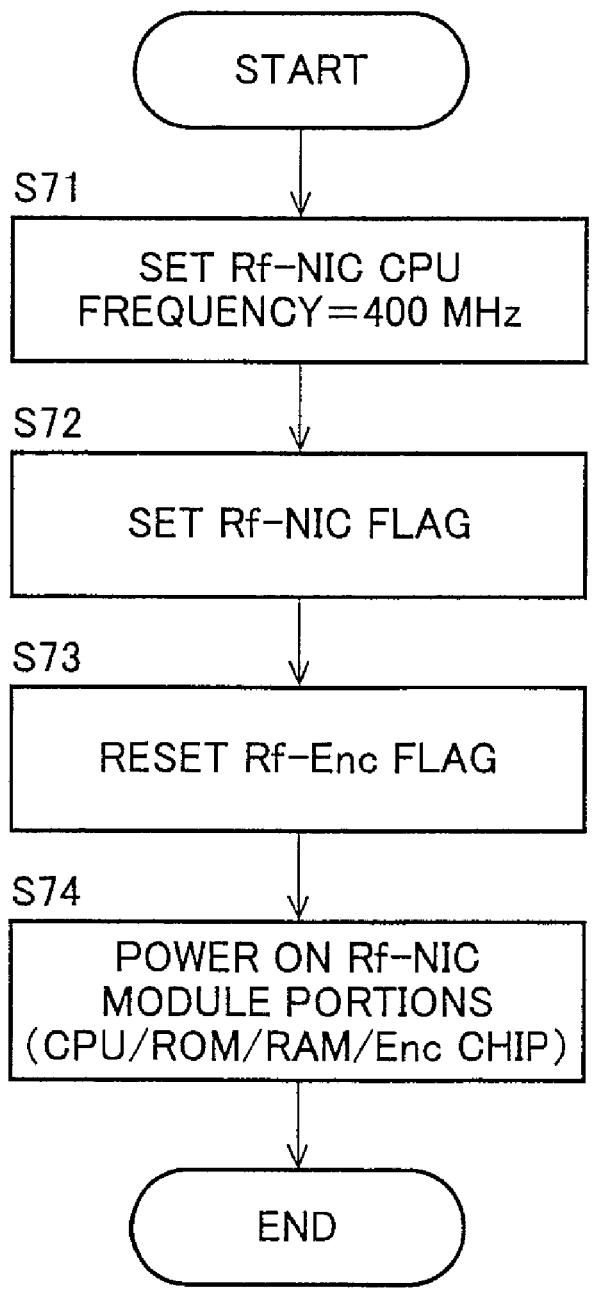
FIG. 15 is a flowchart of the energy-saving setting of the Rf-NIC in the case of 54 Mbps.

With regard to FIG. 4, in the flow of the energy-saving setting in the case of the link speed of 54 Mbps, as shown in FIG. 15, the operation clock frequency of the Rf-NIC CPU is set to 400 MHz (step S71); the Rf-NIC flag is set (step S72); the Rf-Enc flag is reset (step S73); the Rf-NIC module portions (the CPU, the ROM, the RAM, and the encryption chip) are powered on (step S74); and the process is terminated. As described above, the power-saving effect is not generated in the NIC in this case.

Figure 16:
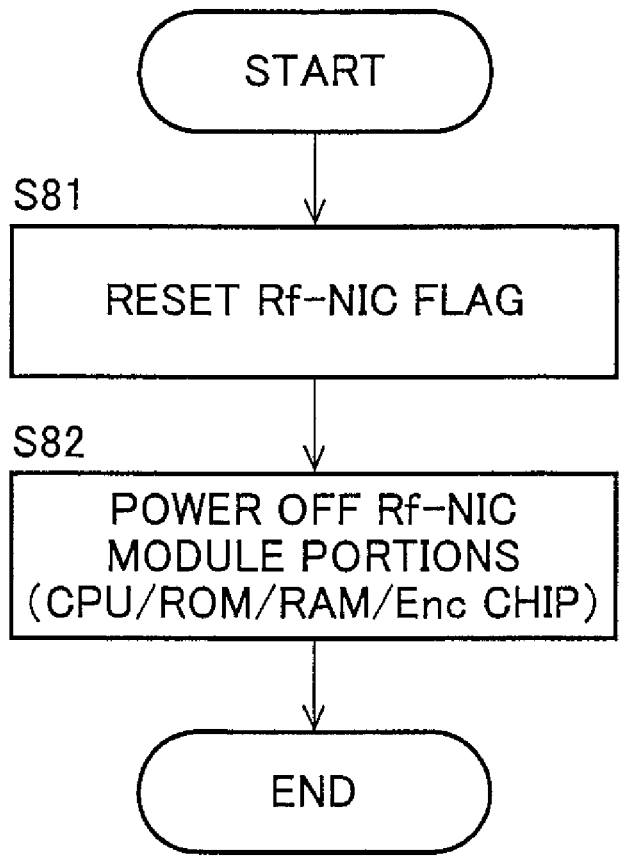
FIG. 16 is a flowchart of the energy-saving setting of the Rf-NIC in the case of 11 Mbps.

In the energy-saving setting in the case of the link speed of 11 Mbps and no link, as shown in FIG. 16, the Rf-NIC flag is reset (step S81); the Rf-NIC module portions (the CPU, the ROM, the RAM, and the encryption chip) are powered off (step S82); and the process is terminated.

Figure 17:
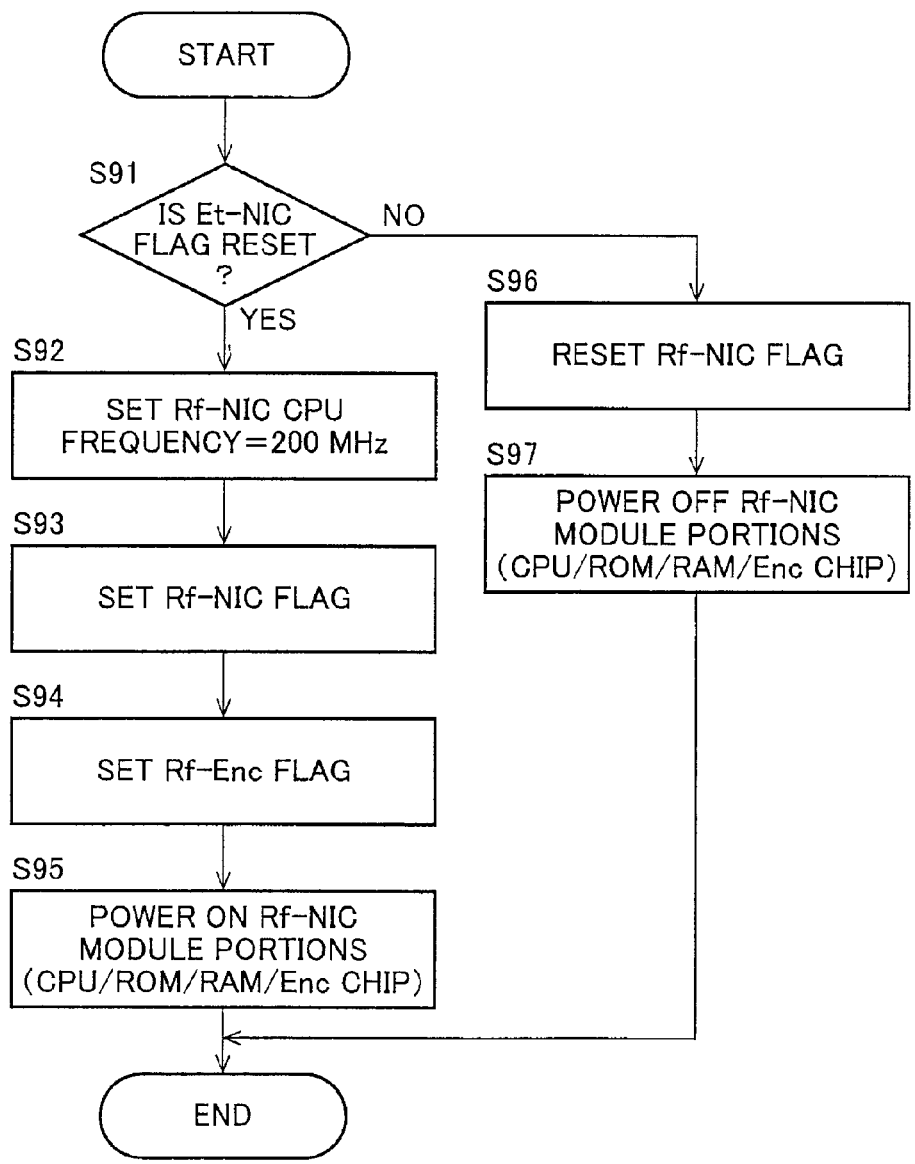
FIG. 17 is a flowchart of the energy-saving setting of the Rf-NIC in the case of 11 Mbps when an energy-saving state of the wired NIC is added to the condition.

FIG. 17 depicts an energy-saving setting flow of the energy-saving process (1) of lowering the operation clock frequency of the CPU 31 of the wireless NIC 30 to 200 MHz when the network process of transmitted/received data of the wired NIC 20 is performed by the CPU 11 of the printer controller 10 (in the table of FIG. 5, condition: 11b/11 Mbps, energy-saving process (1): MFPC) in FIG. 3. It is determined whether the Et-NIC flag is reset (step S91); if the flag is reset (step S91/Y), the Rf-NIC CPU frequency is set to 200 MHz (step S92); the flags of the Rf-NIC and the Rf-Enc are set (steps S93 and S94); the Rf-NIC module portions (the CPU/ROM/RAM/Enc-Chip) are powered on (step S95); and the process is terminated. On the other hand, if the Et-NIC flag is not reset at step S91, Rf-NIC flag is reset (step S96); the Rf-NIC module portions (the CPU/ROM/RAM/Enc-Chip) are powered off (step S97); and the process is terminated.

As described above, according to the present invention, while ensuring the process ability necessary for the link speed, the NIC of the system device can be driven to perform the optimum power-saving operation by employing the appropriate combination of a plurality of energy-saving processes suppressing the power consumption depending on the link speed.

If a plurality of the NICs are connected, while ensuring the processing ability of the NICs, the overall optimum power-saving operation can be achieved by employing the energy-saving process such as executing the protocol process of the other NIC (wireless) on the side of the NIC with higher speed due to the power-saving state (protocol process with the printer controller) of one NIC (wired).

According to the present invention, in the system device including the NIC for transmitting/receiving data through a network, the electric power consumed by the constituent elements in the NIC is stepwise reduced by causing the NIC to show the real performance when a high-speed process is needed and by selectively lowering or terminating the processing ability of the NIC when the high-speed process is not needed depending on the link status, and therefore, the reasonable power-saving operation of the NIC can be performed.

The invention claimed is:

1. A system device comprising a NIC including a network I/F, a protocol process functional portion, and an encryption process functional portion as well as a controller responsible for overall control, the controller performing, depending on a link status, power-saving control that selectively reduces or terminates processing abilities of the protocol process functional portion and/or the encryption process functional portion by executing for the protocol process functional portion and/or the encryption process functional portion of the NIC a combination of different energy-saving processes corresponding to the processing functions thereof to stepwise reduce electric power consumed by constituent elements of the process functional portions depending on the link status, wherein in one of the energy-saving processes, it is determined whether a protocol process is performed by the NIC or the controller in accordance with the link status, and wherein if the process is performed by the controller, the power supply to the protocol process functional portion and the encryption process functional portion is terminated in the NIC, in another one of the energy-saving processes, depending on the link status, an operation clock frequency is changed in a CPU, which is one of constituent elements of the protocol process functional portion and the encryption process functional portion, and in yet another one of the energy-saving processes, encryption by hardware and encryption by software are switched in an encryption process executed by the encryption process functional portion depending on the link status.

2. The system device comprising a NIC as defined in claim 1, wherein the power consumption information of the constituent elements implementing the functions of the NIC is stored in a storage portion and wherein based on the power consumption information of the constituent elements acquired from the storage portion, the controller determines an optimum combination of the energy-saving processes depending on the link status.

3. The system device comprising a NIC as defined in claim 2, wherein the order of the power consumption in the energy-saving processes is preliminarily determined and wherein the order is adapted to the order of execution of the combined energy-saving processes.

4. The system device comprising a NIC as defined in claim 1, wherein the power-saving control is performed by executing a predetermined program with the CPU of the controller.

5. The system device comprising a NIC as defined in claim 4, wherein the predetermined program is acquired from a storage portion of the NIC portion.

6. The system device comprising a NIC as defined in claim 1, wherein if a plurality of NICs are connected to the controller, a power-saving state of the other NIC portion is added to the condition for determining the combination of the energy-saving processes and/or the order of application of the combined energy-saving processes for one NIC portion.

7. A power-saving controlling method of a system device comprising a NIC including a network I/F, a protocol process functional portion, and an encryption process functional portion, the method comprising:

performing power-saving control that, depending on a link status, selectively reduces or terminates processing abilities of the protocol process functional portion and/or the encryption process functional portion by executing for the protocol process functional portion and/or the encryption process functional portion of the NIC a combination of different energy-saving processes corresponding to the processing functions thereof to thereby stepwise reduce electric power consumed by constituent elements of the process functional portions in accordance with the link status, wherein the energy-saving processes include (1) determining whether a protocol process is performed by the NIC or the controller depending on the link status and turning off the power supply to the protocol process functional portion and the encryption process functional portion in the NIC if the process is performed by the controller, (2) changing an operation clock frequency of a CPU of the NIC implementing the functions of the protocol process functional portion and the encryption process functional portion depending on the link status, and (3) switching the encryption process by hardware and the encryption process by software in the NIC depending on the link status.

* * * * *